United States Patent
Vezzani et al.

(10) Patent No.: US 9,822,751 B2
(45) Date of Patent: Nov. 21, 2017

(54) FUEL PUMP FOR A DIRECT INJECTION SYSTEM

(71) Applicant: MAGNETI MARELLI S.p.A., Corbetta (IT)

(72) Inventors: Enrico Vezzani, Bologna (IT); Michele Petrone, San Lazzaro di Savena (IT); Luca Mancini, Budrio (IT)

(73) Assignee: Magneti Marelli S.p.A., Corbetta (IT)

( * ) Notice: Subject to any disclaimer, the term of this patent is extended or adjusted under 35 U.S.C. 154(b) by 0 days.

(21) Appl. No.: 14/847,286

(22) Filed: Sep. 8, 2015

(65) Prior Publication Data
US 2016/0069313 A1    Mar. 10, 2016

(30) Foreign Application Priority Data
Sep. 8, 2014    (IT) ............................. BO2014A0493

(51) Int. Cl.
*F02M 63/02*    (2006.01)
*F16F 1/04*    (2006.01)
(Continued)

(52) U.S. Cl.
CPC ........ F02M 63/0265 (2013.01); F02M 59/06 (2013.01); F02M 59/102 (2013.01);
(Continued)

(58) Field of Classification Search
CPC .... F02M 63/02; F02M 63/0265; F02M 59/06; F02M 59/201; F02M 2200/02;
(Continued)

(56) References Cited

U.S. PATENT DOCUMENTS 4,745,900 A * 5/1988 Thudt ...................... F02D 1/08
123/357
6,145,762 A   11/2000 Orloff et al.
(Continued)

FOREIGN PATENT DOCUMENTS

DE          19905790 A1    8/2000
DE     102011089934 A1    6/2013
(Continued)

OTHER PUBLICATIONS

Search Report dated May 21, 2015 issued in Italian Patent Application No. BO20140493.

*Primary Examiner* — John Kwon
*Assistant Examiner* — Johnny H Hoang
(74) *Attorney, Agent, or Firm* — Howard & Howard Attorneys PLLC

(57) ABSTRACT

Fuel pump for a direct injection system provided with a common rail. The fuel pump has a pumping chamber defined in a main body; a piston which is mounted in a sliding manner inside the pumping chamber to cyclically vary the volume of the pumping chamber; an intake channel which originates from a wall of the pumping chamber; an intake valve which is coupled to the intake channel; a delivery channel which originates from a wall of the pumping chamber; a delivery valve which is coupled to the delivery channel; and an actuating spring which has a plurality of turns having a pitch that varies between the turns and that is coupled to the piston so as to push the piston towards a maximum volume or minimum volume position of the pumping chamber.

8 Claims, 7 Drawing Sheets

(51) Int. Cl.
  *F02M 59/06* (2006.01)
  *F02M 59/10* (2006.01)
  *F04B 1/04* (2006.01)
  *F04B 53/10* (2006.01)

(52) U.S. Cl.
  CPC .......... *F04B 1/0426* (2013.01); *F04B 1/0452* (2013.01); *F04B 53/1002* (2013.01); *F16F 1/047* (2013.01); *F02M 2200/02* (2013.01)

(58) Field of Classification Search
  CPC .. F04B 1/0452; F04B 1/0426; F04B 53/1002; F16F 1/047
  USPC ....... 123/446, 456, 457, 467, 406, 510, 511, 123/514; 417/307, 309, 311
  See application file for complete search history.

(56) References Cited

U.S. PATENT DOCUMENTS

| | | | | |
|---|---|---|---|---|
| 7,401,593 B2* | 7/2008 | Rembold | ........... | F02M 63/0036 123/446 |
| 7,677,872 B2* | 3/2010 | Beardmore | ............ | F02M 55/04 417/307 |
| 2003/0183794 A1* | 10/2003 | McGrath | ............... | F04B 35/045 251/129.18 |
| 2006/0275166 A1* | 12/2006 | Mattioli | ............... | F02M 59/102 417/571 |
| 2007/0286742 A1* | 12/2007 | Inoue | ..................... | F02M 59/02 417/269 |
| 2009/0252621 A1* | 10/2009 | Siegel | ................ | F02M 63/0036 417/307 |
| 2010/0242922 A1* | 9/2010 | Mancini | ............... | F02M 59/462 123/506 |
| 2010/0248079 A1* | 9/2010 | Kinouchi | ............... | C21D 6/002 429/513 |

FOREIGN PATENT DOCUMENTS

| | | |
|---|---|---|
| EP | 2236809 A2 | 10/2010 |
| EP | 2549160 A1 | 1/2013 |
| FR | 802008 A | 8/1936 |
| JP | 2006207451 A * | 8/2006 |

* cited by examiner

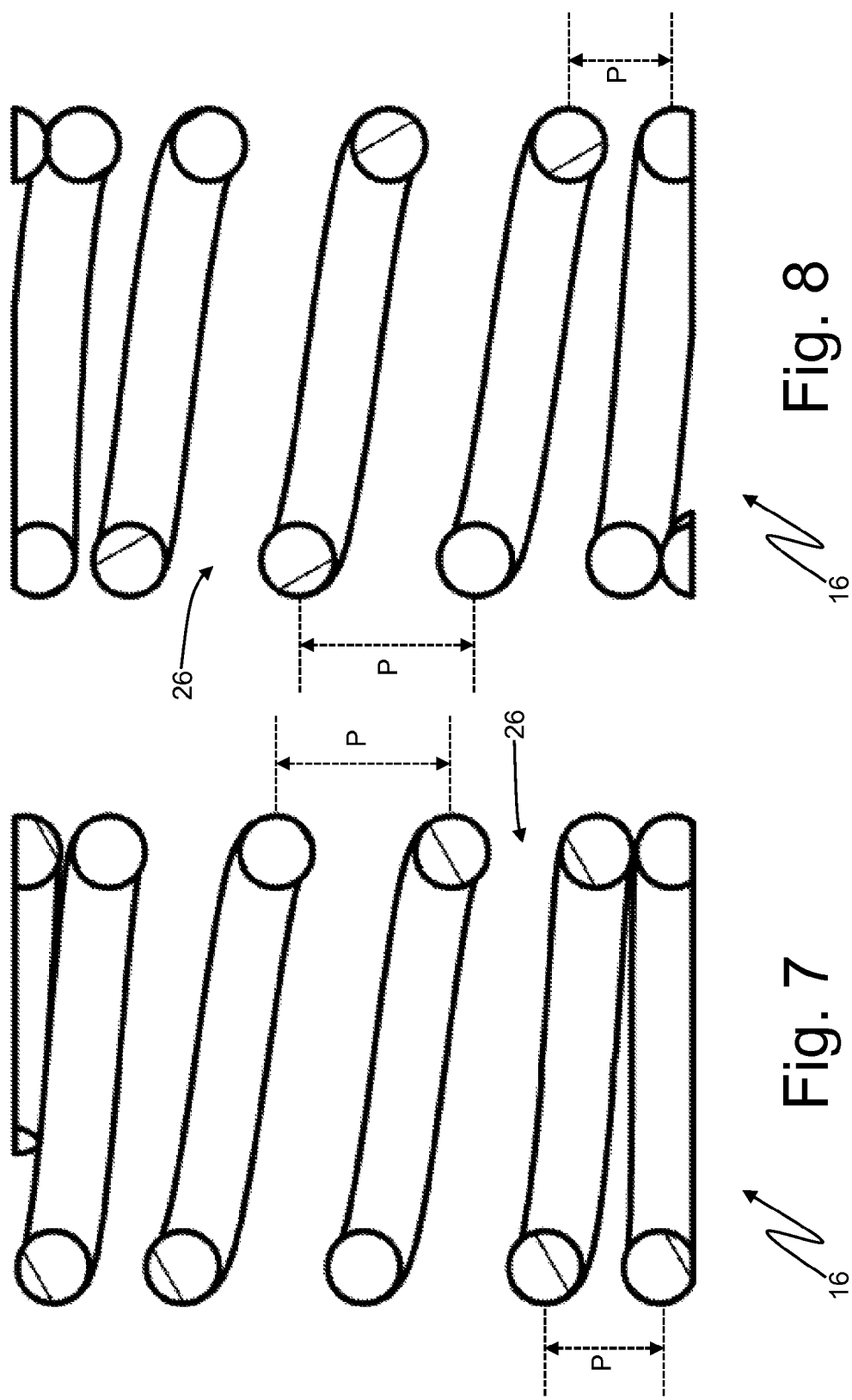

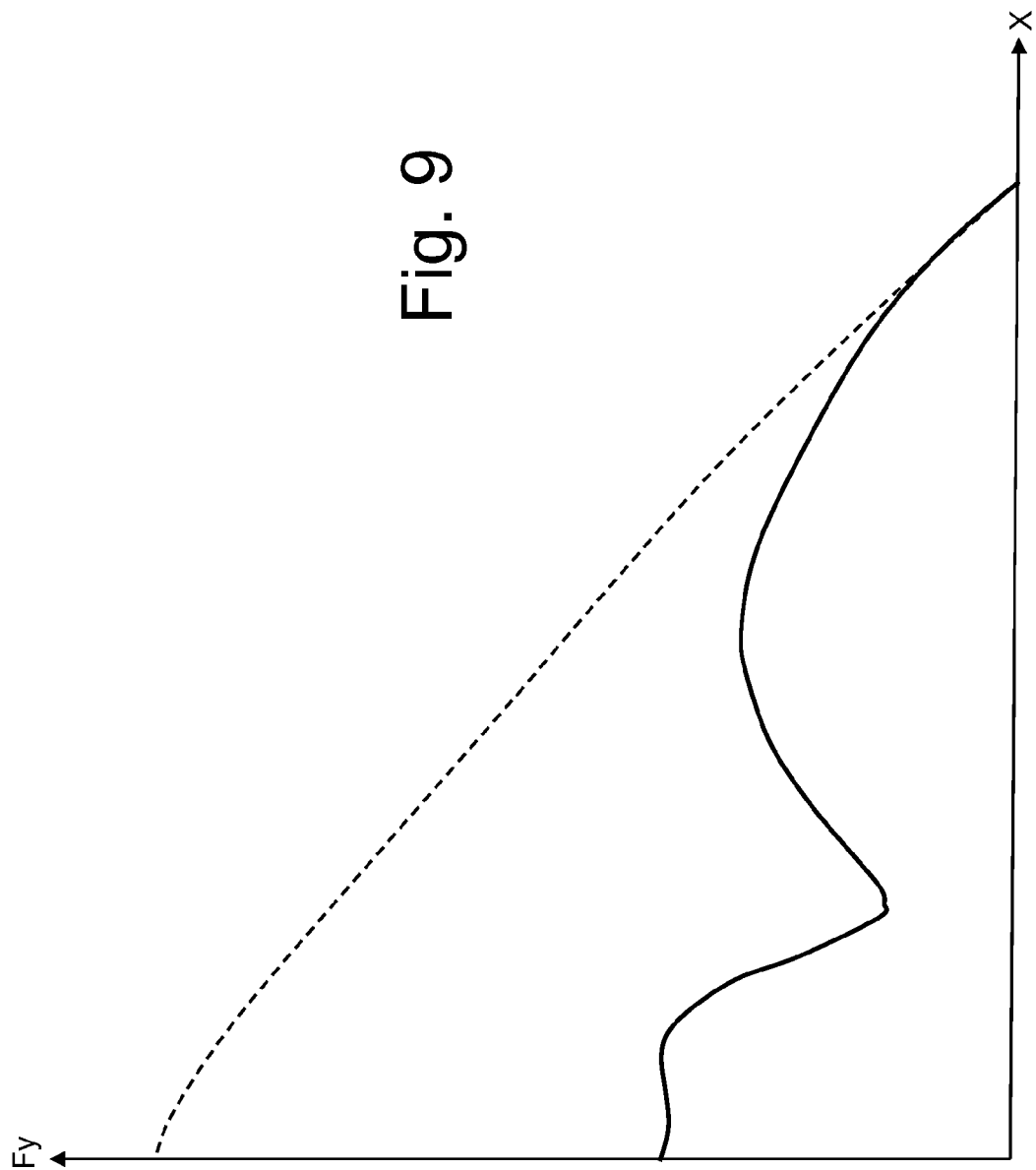

FUEL PUMP FOR A DIRECT INJECTION SYSTEM

CROSS-REFERENCE TO RELATED APPLICATIONS

The present application claims priority to and all the benefits of Italian Patent Application No. BO2014A000493, filed on Sep. 8, 2014, which is hereby expressly incorporated herein by reference in its entirety.

BACKGROUND OF THE INVENTION

1. Field of the Invention

The present invention relates to a fuel pump for a direct injection system.

2. Description of the Related Art

A direct injection system comprises a plurality of injectors, a common rail that feeds the fuel under pressure to the injectors, a high-pressure fuel pump that feeds the fuel to the common rail through a high-pressure feeding conduit and is provided with a flow-rate-adjustment device, and a control unit that pilots the flow-rate-adjustment device for keeping the fuel pressure inside the common rail equal to a desired-value generally time-course variable as a function of the operating conditions of the engine.

The high-pressure fuel pump described in European patent application no. 2236809A2 comprises a pumping chamber in which a piston slides with alternating motion, an intake channel regulated by a intake valve for feeding the low-pressure fuel inside the pumping chamber, and a delivery conduit regulated by a delivery valve for feeding the high-pressure fuel outside the pumping chamber and towards the common rail through the feeding conduit. A lower portion of the piston is coupled, on one side, to an actuating spring which tends to push the piston towards a position of maximum volume of the pumping chamber and, on the other side, is coupled to a cam that is set in rotation by the driving shaft to cyclically move the piston compressing the actuating spring.

The high-pressure fuel pump described above has an adequately long operating life to fully satisfy the demands of durability of internal combustion engines manufacturers. However, it has been observed that towards the end of the expected operating life seizures of the piston may occur (i.e. locking of the piston due to excessive sliding friction).

U.S. Pat. No. 6,145,762A describes an electromagnetic fuel injector provided with a closing spring, which has a variable pitch between the turns for reducing wear due to fatigue of the closing spring. In particular, the use of a closing spring with variable pitch between the turns serves to solve the problem of premature breakage due to usage caused by longitudinal oscillations of the closing spring from its natural oscillation frequency. When the pitch between the turns of the closing spring is variable, in case of resonance corresponding to a harmonic, the end turns open and close varying the natural oscillation frequency of the closing spring, and therefore pushing the closing spring out from the resonance (in this way, the spring does not oscillate from its natural oscillation frequency as the natural oscillation frequency is continuously variable).

French patent application no. 802008A describes a return spring for a valve of an internal combustion engine, in which the return spring has a variable pitch between the turns for reducing wear due to fatigue of the return spring. The wear due to fatigue of the return spring is amplified by vibratory phenomena that can be triggered in the return spring; in the event of the occurrence of vibratory phenomenon in the return spring, the ends of the return spring (having a reduced pitch between the turns) tend to come in mutual contact determining a vibration damping.

SUMMARY OF THE INVENTION

The object of the present invention is to provide a fuel pump for a direct injection system, the fuel pump has an increased operating life and is both easy and inexpensive to produce.

Accordingly, the present invention is directed toward a fuel pump for a direct injection system provided with a common rail. The fuel pump includes a pumping chamber defined in a main body; a piston which is mounted in a sliding manner inside the pumping chamber to cyclically vary the volume of the pumping chamber; an intake channel, which originates from a wall of the pumping chamber; an intake valve which is coupled to the intake channel; a delivery channel which originates from a wall of the pumping chamber; a delivery valve which is coupled to the delivery channel; and an actuating spring. The spring includes a plurality of turns and is coupled to the piston so as to push the piston towards a maximum volume or minimum volume position of the pumping chamber. The actuating spring has, along its length, a pitch (P) that is variable between the turns so that at each cycle of the piston a predetermined portion of the turns that is less than all of the turns pack—tighten together so as to change the application direction of the lateral load generated by the actuating spring for limiting the maximum value of lateral load.

Other objects, features and advantages of the present invention will be readily appreciated as the same becomes better understood after reading the subsequent description taken in connection with the accompanying drawings.

BRIEF DESCRIPTION OF THE DRAWINGS

FIG. 7 is a different sectional view of the actuating spring of FIG. 4 according to the section lines VII-VII;

FIG. 8 is a different sectional view of the actuating spring of FIG. 5 according to the section lines VIII-VIII; and FIG. 9 is a graph illustrating the evolution of the lateral load (thrust) of a closing spring as the axial load (thrust) increases.

DETAILED DESCRIPTION OF THE INVENTION

Figure 1:
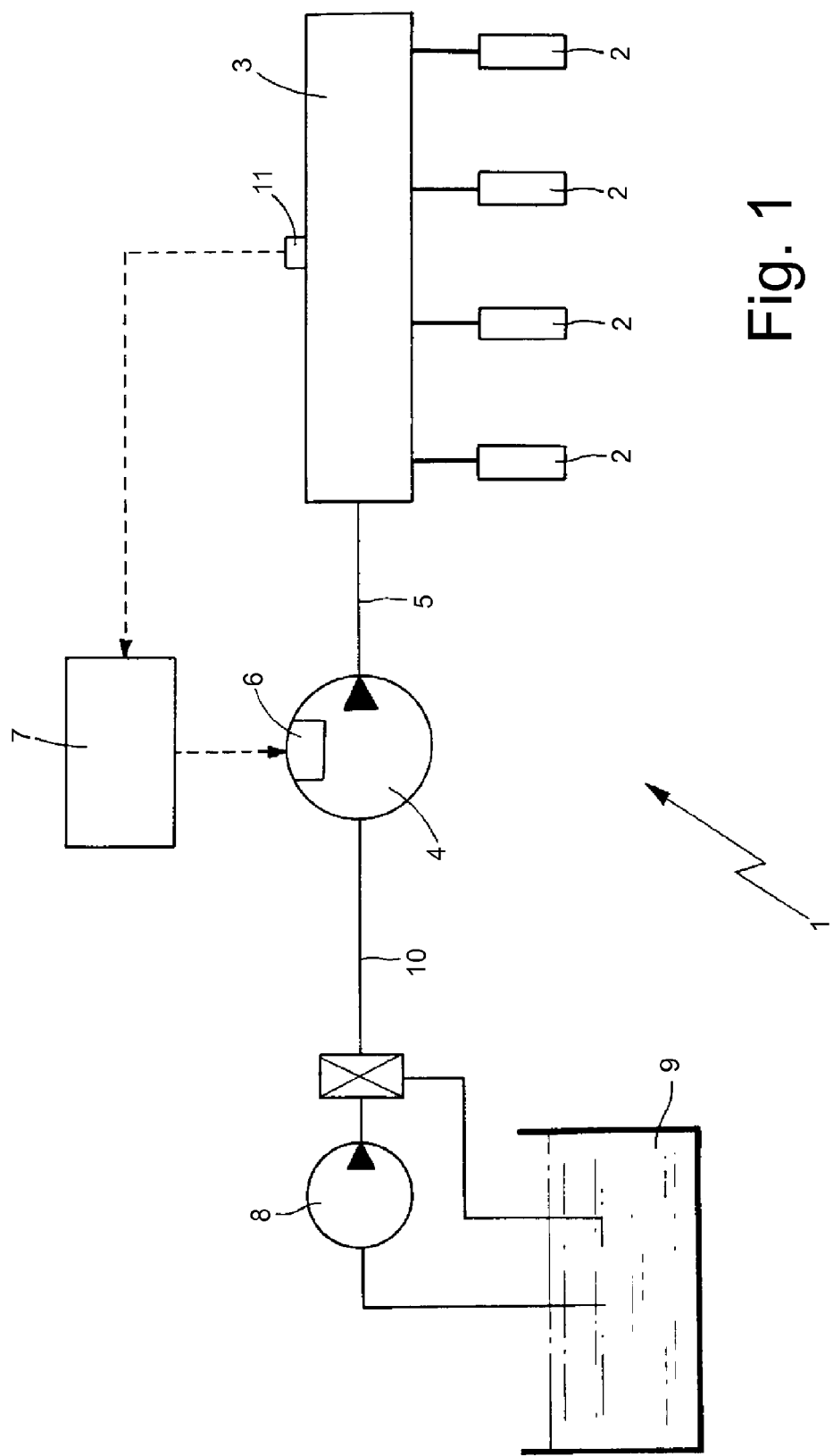
FIG. 1 is a schematic view and with parts removed for clarity of a direct fuel injection system of a common rail type.

In FIG. 1, reference number 1 designates a system for the direct injection of fuel of a common rail type for an internal combustion thermal engine as a whole. The direct injection system 1 comprises a plurality of injectors 2, a common rail 3 that feeds the pressurized fuel to the injectors 2, a high-pressure pump 4, which feeds the fuel to the common rail 3 through a feed conduit 5 and is provided with a flow-rate-adjustment device 6, a control unit 7 that keeps the fuel pressure inside the common rail 3 equal to a desired-value generally time-course variable as a function of the operating conditions of the engine, and a low-pressure pump 8 that feeds the fuel from a tank 9 to the high-pressure pump 4 through a feed conduit 10.

The control unit 7 is coupled to the flow-rate-adjustment device 6 to control the flow rate of the high-pressure pump 4 so as to feed the common rail 3, instant by instant, with the amount of fuel necessary to obtain the desired pressure value inside the common rail 3. In particular, the control unit 7 regulates the flow rate of the high-pressure pump 4 by a feedback control using as variable feedback the value of the fuel pressure inside the common rail 3, pressure value detected in real time by a pressure sensor 11.

Figure 2:
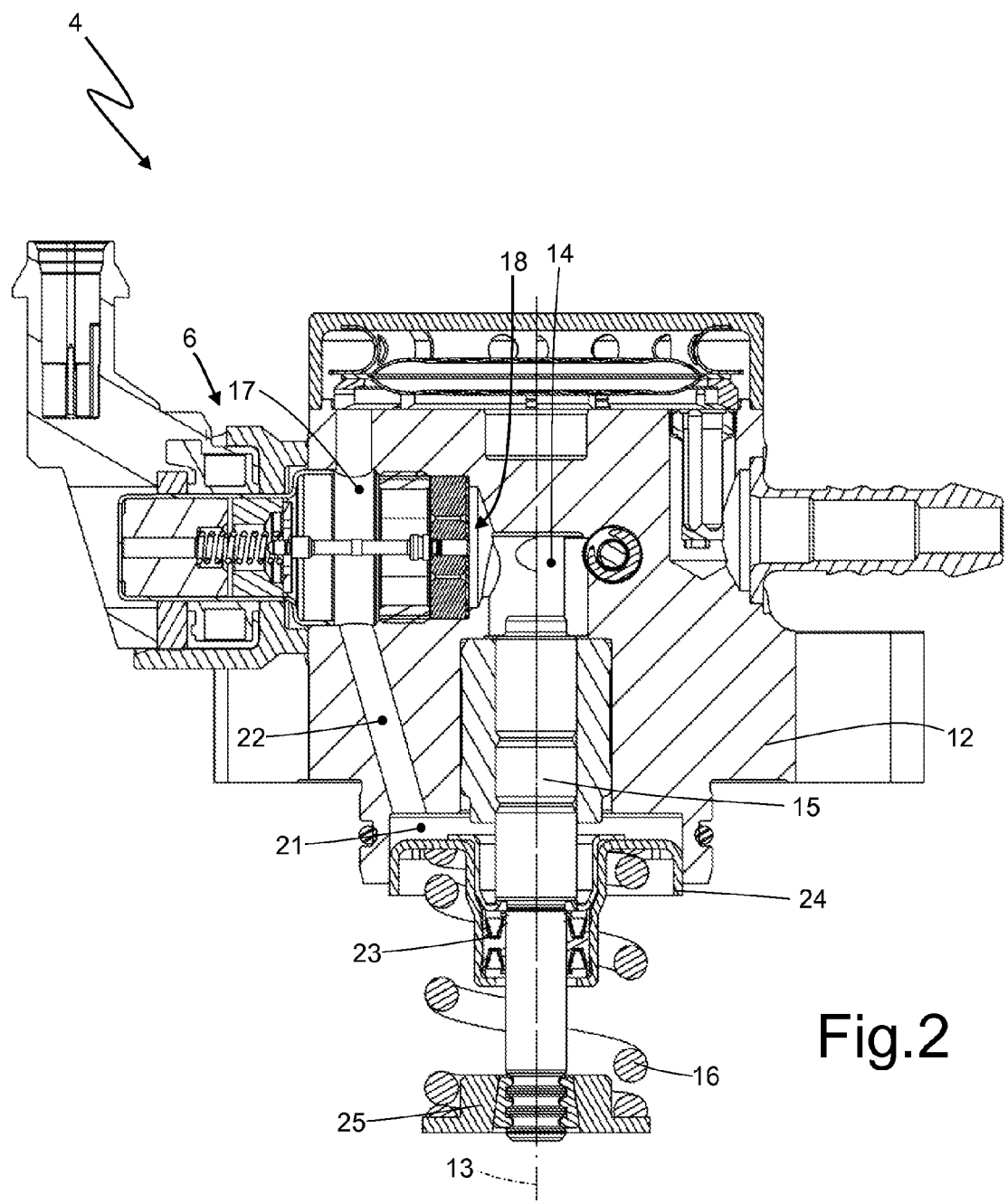
FIG. 2 is a schematic longitudinal sectional view, and with parts removed for clarity of a high-pressure fuel pump of the direct injection system of FIG. 1.

As shown in FIG. 2, the high-pressure pump 4 comprises a main body 12 which has a longitudinal axis 13 and defines in its inside a cylindrical-shaped pumping chamber 14. Inside the pumping chamber 14 a piston 15 is mounted in a sliding manner which by moving with a reciprocating motion along the longitudinal axis 13 causes a cyclic variation of the volume of the pumping chamber 14. A lower portion of the piston 15 is coupled, on one side, to an actuating spring 16 which tends to push the piston 15 towards a position of maximum volume of the pumping chamber 14 and, the other side, is coupled to a cam (not illustrated) which is set in rotation by the drive shaft to cyclically move the piston 15 upwards compressing the actuating spring 16. According to a different and perfectly equivalent embodiment, the actuating spring 16 instead of pushing the piston 15 towards a position of maximum volume of the pumping chamber 14, pushes the piston 15 towards a position of minimum volume of the pumping chamber 14.

From a lateral wall of the pumping chamber 14 an intake channel 17 originates which is connected to the low-pressure pump 8 via the supply conduit 10 and is regulated by an intake valve 18 arranged at the pumping chamber 14. The intake valve 18 is normally controlled under pressure and should no external intervention occur the intake valve 18 is closed when the fuel pressure in the pumping chamber 14 is higher than the fuel pressure in the intake channel 17 and is open when the fuel pressure in the pumping chamber 14 is lower than the fuel pressure in the intake channel 17.

Figure 3:
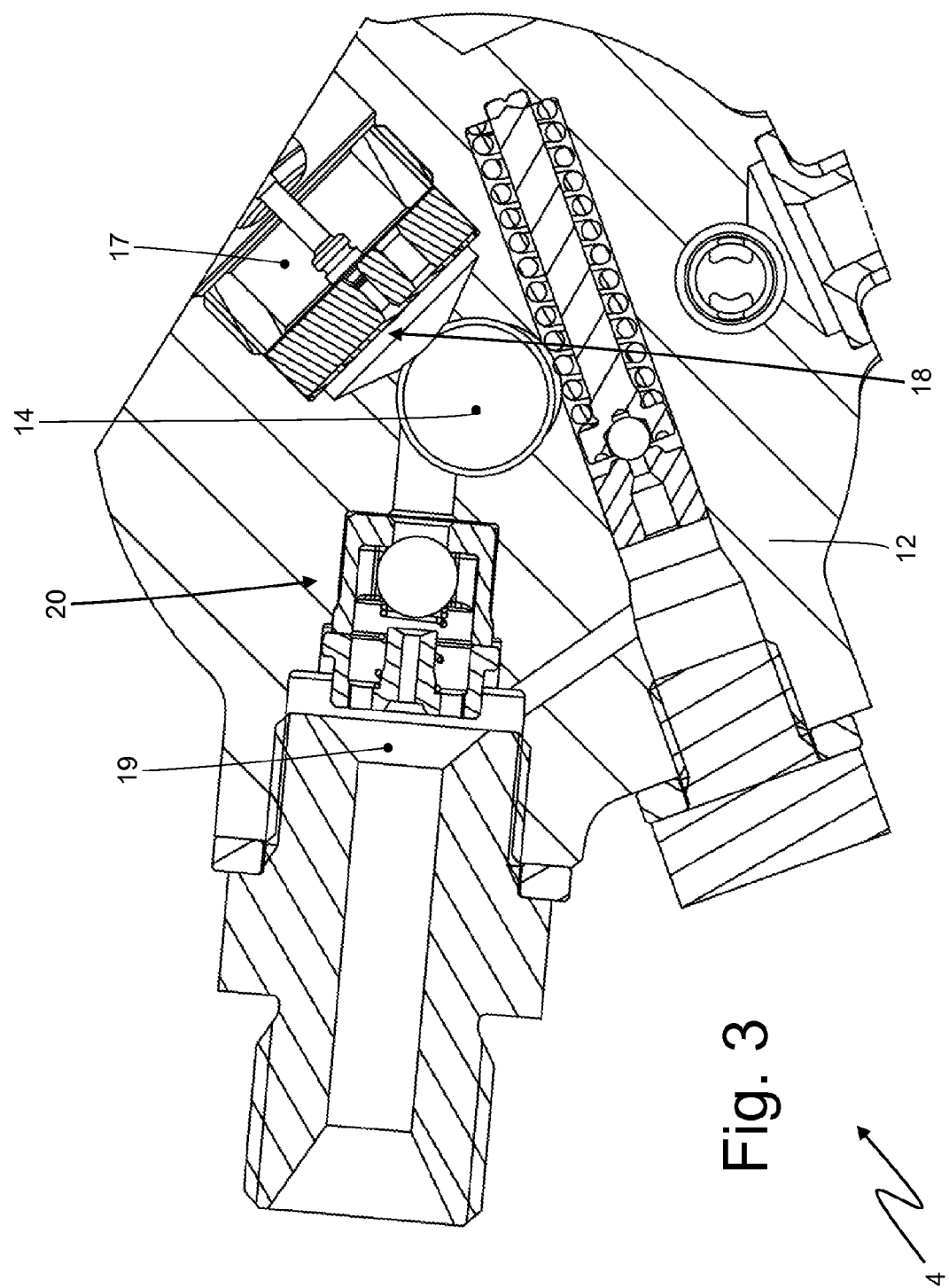
FIG. 3 is a schematic cross-sectional view, and with parts removed for clarity of the high-pressure fuel pump of FIG. 2.
Figure 5:
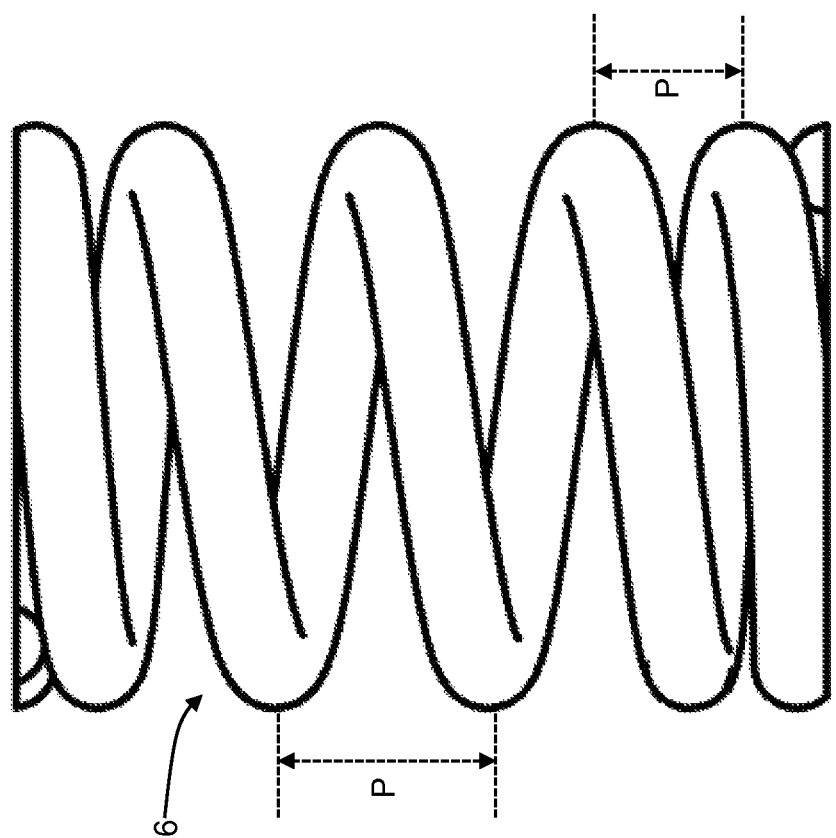
FIG. 5 is another different lateral view of an actuating spring of the high-pressure fuel pump of FIG. 2.
Figure 4:
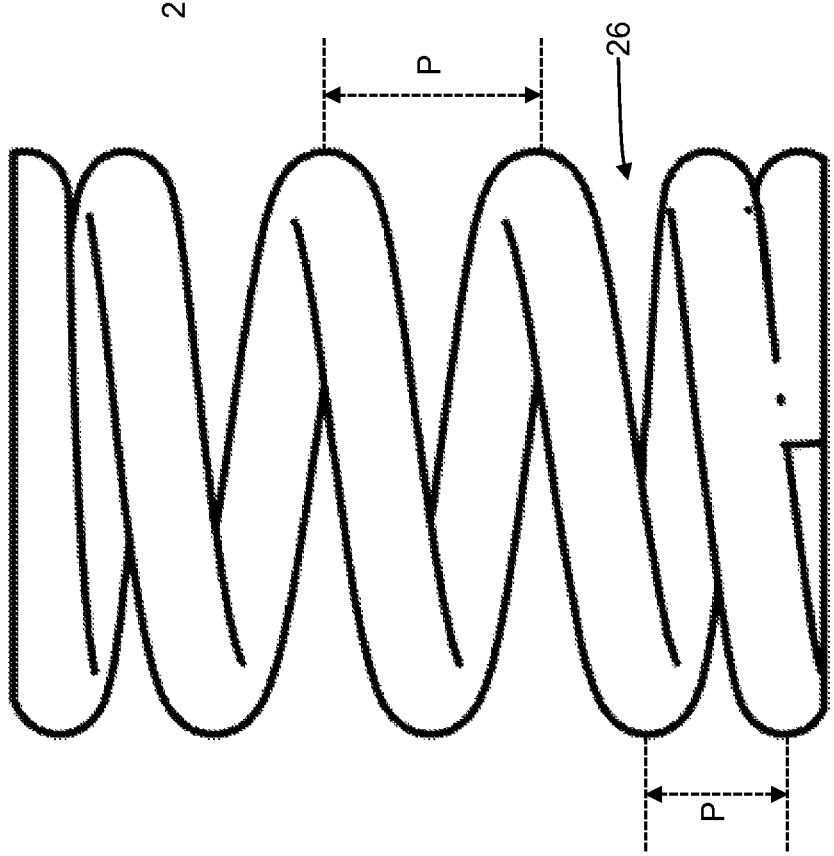
FIG. 4 is a different lateral view of an actuating spring of the high-pressure fuel pump of FIG. 2.
Figure 6:
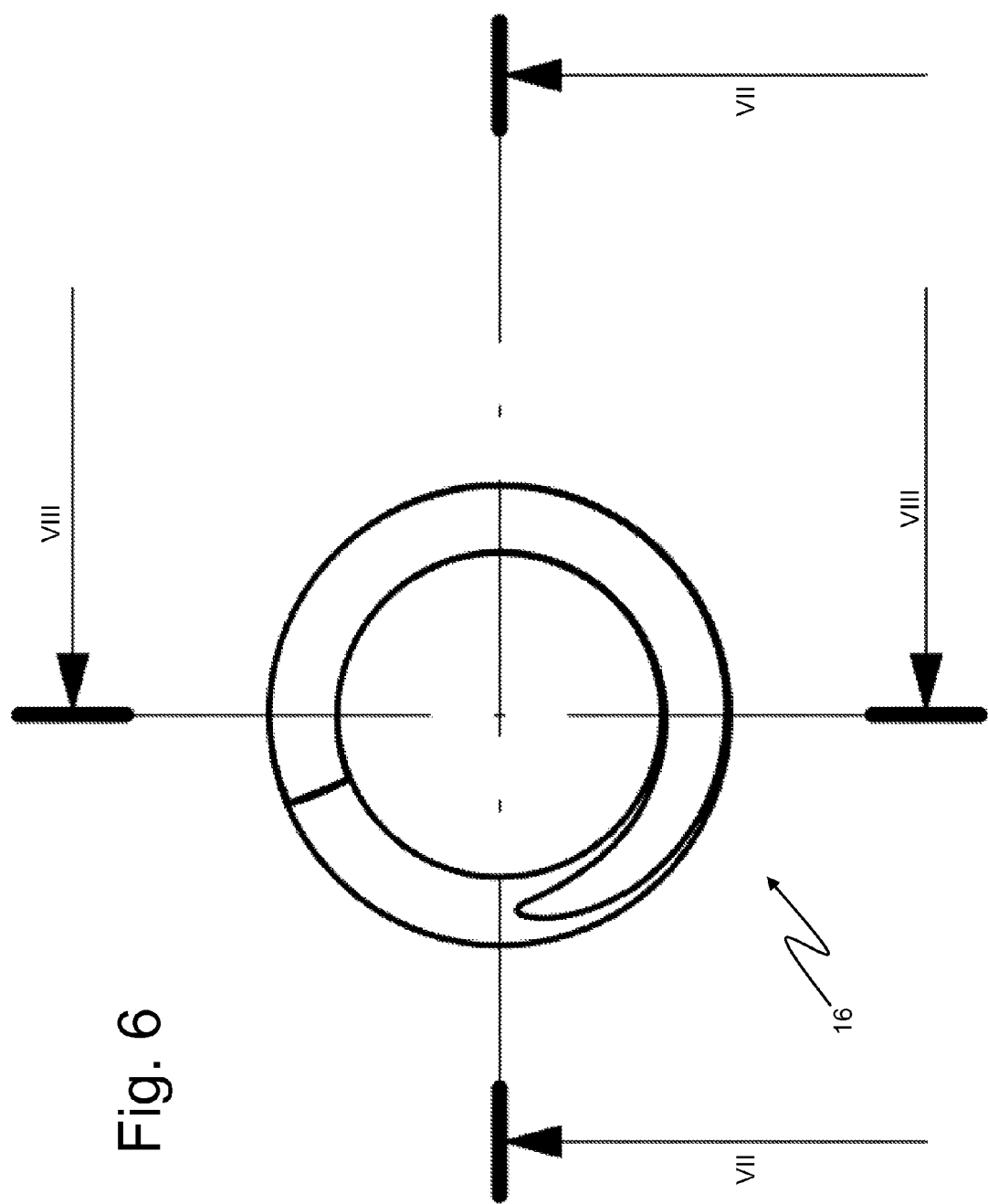
FIG. 6 is a top view of the actuating spring of the embodiment of FIGS. 4 and 5.

As illustrated in FIG. 3, from a lateral wall of the pumping chamber 14 and from the opposite side with respect to intake channel 17 a delivery channel 19 originates which is connected to the common rail 3 via the feed conduit 5 and is regulated by an unidirectional delivery valve 20 which is arranged at the pumping chamber 14 and allows only an outgoing fuel flow from the pumping chamber 14. The delivery valve 20 is controlled under pressure and is open when the fuel pressure in the pumping chamber 14 is higher than the fuel pressure in the delivery channel 19 and is closed when the fuel pressure in the pumping chamber 14 is lower than the fuel pressure in the delivery channel 19.

As shown in FIG. 2, the flow-rate-adjustment device 6 is mechanically coupled to the intake valve 18 enabling the control unit 7 to keep, when necessary, the intake valve 18 open during a pumping phase of the piston 15 and then allow a fuel flow outgoing from the pumping chamber 14 through the intake channel 17.

Inside the main body 12 a collecting chamber 21 is formed, which is arranged below the pumping chamber 14, is crossed by an intermediate portion of the piston 15 which is shaped so as to cyclically vary the volume of the collecting chamber 21 by the effect of its reciprocating movement and is connected to the intake channel 17 by a connecting channel 22 opening into the intake valve 18. Below the collecting chamber 21 a gasket 23 of annular seal is provided, which is arranged about a lower portion of the piston 15 and has the function of preventing leakages of fuel along the lateral wall of the piston 15. According to a preferred embodiment, the collecting chamber 21 is delimited at the top and laterally by a lower surface of the main body 12 and is delimited at the bottom by an annular cap 24 which is laterally welded to the main body 12. As illustrated in FIG. 2, the actuating spring 16 is compressed between a lower wall of the annular cap 24 and an upper wall of an annular expansion 25 integral with the lower end of the piston 15. In this way, the actuating spring 16 is arranged outside the main body 12 and is therefore both visually inspectable, and fully isolated from the fuel. The cam (not shown) that is set in rotation by the drive shaft of the motor rests on the piston 15 from the opposite side of the actuating spring 16 to move the piston 15 cyclically upwards, compressing the actuating spring 16.

As illustrated in FIGS. 4-8, the actuating spring 16 is a helical compression spring comprising a plurality of open turns 26 that are wound and dimensioned to exert compression along the axis of the actuating spring 16. Preferably, the actuating spring 16 is cylindrical shaped, and therefore maintains the same outer diameter throughout its entire length. The two end turns 26, i.e. the two turns 26 arranged at the opposite ends of the actuating spring 16 which rest respectively on the annular cap 24 and at the annular expansion 25, are dead, i.e. they do not contribute in generating the elastic force when the actuating spring 16 is compressed. The function of the dead end turns 26 is to transmit by direct contact the elastic force generated by the actuating spring 16, and therefore the dead end turns 26 must ensure flatness and stability. The intermediate turns 26 comprised between the two dead end turns 26 are instead all active, i.e. all contribute to generating the elastic force when the actuating spring 16 is compressed.

The actuating spring 16 has, along its length, a pitch P that is variable between the turns 26 (i.e. an average distance between two contiguous turns 26) so that at least at one end of the actuating spring 16 the pitch P between the turns 26 is smaller than the pitch P between the turns 26 at a central portion. In particular, the pitch P between the turns 26 is variable so that at each cycle of the piston 15 a predetermined portion of the turns that is less than all of the turns 26 pack—tighten together so as to change the application direction of the lateral load generated by the actuating spring 16 limiting the maximum value of the lateral load.

In the embodiment illustrated in the attached figures, at both ends of the actuating spring 16 the pitch P between the turns 26 is smaller than the pitch P between the turns 26 at the central portion. In particular, the pitch P between the turns 26 is identical at both ends of the actuating spring 16. According to a preferred embodiment, at the central portion the pitch P between the turns 26 ranges from 1.2 and 2.2 times (and preferably between 1.4 and 2.0 times) the pitch P between the turns 26 at the ends of the actuating spring 16.

According to one embodiment illustrated in the attached figures, the actuating spring 16 is manufactured in a mirror-like manner relative to a transverse symmetry plane arranged at the center.

In the embodiment illustrated in the attached figures, the actuating spring 16 comprises a total of (i.e. counting both the active turns 26, and the dead ends turns 26) 5.6 turns. More generally, the actuating spring 16 may comprise a total number of turns 26 between 4.5 and 7.5.

It was observed that by imposing a pitch P between the turns 26 shorter at the opposite ends of the actuating spring 16 (i.e. in the proximity of the dead ends turns 26) it is possible to substantially reduce the lateral load (i.e. the lateral thrust) that the actuating spring 16 generates when compressed. Some experimental tests have shown that by imposing a pitch P between the turns 26 shorter at the opposite ends of the actuating spring 16 it is possible to reduce more than half the lateral load (i.e. the lateral thrust) that the actuating spring 16 generates when compressed.

In other words, when the actuating spring 16 is compressed the actuating spring 16 generates both an axial load (thrust) (i.e. directed parallel to the central axis of symmetry), and a lateral load (thrust) (i.e. directed perpendicular to the central axis of symmetry). The axial load (thrust) is useful (desired), that constitutes the function of the actuating spring 16 and is required to properly move the piston 15, while the lateral load (thrust) is damaging (unwanted) since the piston 15 is subjected to radial stress that generate increased wear of the piston 15 (that is both the outer surface of the piston 15, and the inner surface of the cavity along which the piston 15 slides are worn out). By imposing a pitch P between the turns 26 shorter at the opposite ends of the actuating spring 16 it is possible to significantly reduce the lateral load (thrust) at the same axial load (thrust).

Consequently, by imposing a pitch P between the turns 26 shorter at the opposite ends of the actuating spring 16 the wear generated by the sliding piston 15 can be significantly reduced, and therefore is possible to increase the operational life of the high-pressure pump 4 significantly reducing the risk of the jamming of the piston 15.

When the pitch P between the turns 26 is constant along the entire length of the actuating spring 16, during operation, all the turns 26 never pack—tighten together. The pitch P being constant, all the turns 26 would pack—tighten together simultaneously instantly making the actuating spring 16 an inelastic-beam). In this condition, the overall load (thrust) of the actuating spring 16 tends to always lean in the same direction as the actuating spring 16 is compressed by constantly increasing the lateral load (thrust) at the increasing of the axial load (thrust).

When the pitch P between the turns 26 is variable along the length of the actuating spring 16, during operation (i.e. during the cyclic compression and expansion) only some of the turns 26 pack—tighten together. In this condition, the total load (thrust) of the actuating spring 16 varies its inclination, with a very noticeable change when some turns 26 pack—tighten together, decreasing also the lateral load (thrust) as the axial load (thrust) increases.

The above is clearly visible in the graph of FIG. 9, wherein the lateral load (thrust) Fy of an actuating spring 16 with variable pitch P between the turns 26 is represented by a continuous line and with dotted line the lateral load (thrust) Fy of an actuating spring 16 with constant pitch P between the turns 26. Note how in the actuating spring 16 with constant pitch P between the turns 26 the lateral load (thrust) always increases with the decreasing of the axial length X (that is as the axial load (thrust) increases). On the other hand, in the actuating spring 16 with variable pitch P between the turns 26, the lateral load (thrust) increases but also decreases as the axial length X decreases (that is as the axial load (thrust) increases). The axial load (thrust) of the actuating spring 16 with constant pitch P between the turns 26 is therefore as a whole significantly smaller.

The high-pressure pump 4 described above has numerous advantages. In the first place, the high-pressure pump 4 described above has an increased operating life thanks to the reduced possibility of the jamming of the piston 15. This result is obtained using an actuating spring 16 which shows as a whole a reduced lateral load (thrust) which then subjects the piston 15 to lesser wear.

In addition, the high-pressure pump 4 as described above is simple and inexpensive to produce, since the production and assembly costs of the actuating spring 16 described above are virtually completely identical to the production and assembly costs of a standard actuating spring.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A fuel pump for a direct injection system provided with a common rail; the fuel pump comprises:
   a pumping chamber defined in a main body;
   a piston which is mounted in a sliding manner inside the pumping chamber to cyclically vary the volume of the pumping chamber;
   an intake channel, which originates from a wall of the pumping chamber;
   an intake valve which is coupled to the intake channel;
   a delivery channel which originates from a wall of the pumping chamber;
   a delivery valve which is coupled to the delivery channel; and
   an actuating spring, which comprises a plurality of turns and is coupled to the piston so as to push the piston towards a maximum volume or minimum volume position of the pumping chamber;
   wherein the actuating spring has, along its length, a pitch (P) that is variable between the turns so that at each cycle of the piston a predetermined portion of the turns that is less than all of the turns pack—tighten together so as to change an application direction of a lateral load generated by the actuating spring for limiting a maximum value of lateral load;
   wherein at both ends of the actuating spring, the pitch (P) between the turns is smaller than the pitch (P) between the turns at a central portion.

2. The fuel pump as set forth in claim 1, wherein the pitch (P) between the turns is identical at both ends of the actuating spring.

3. The fuel pump as set forth in claim 1, wherein, at a central portion, the pitch (P) between the turns ranges from 1.2 and 2.2 times the pitch (P) between the turns at least at one end of the actuating spring.

4. The fuel pump as set forth in claim 1, wherein at a central portion, the pitch (P) between the turns ranges from 1.4 and 2.0 times the pitch (P) between the turns at least at one end of the actuating spring.

5. The fuel pump as set forth in claim 1, wherein the actuating spring comprises two dead turns at the opposite ends of the actuating spring.

6. The fuel pump as set forth in claim 1, wherein the actuating spring comprises, as a whole, a number of turns ranging from 4.5 to 7.5.

7. The fuel pump as set forth in claim 1, wherein the actuating spring is manufactured in a mirror-like manner relative to a transverse symmetry plane arranged at the center.

8. The fuel pump as set forth in claim 1, wherein, when the pitch (P) between the turns is variable along the length of the actuating spring, during the cyclical compression and expansion, only some of the turns pack-tighten together; in this condition, the overall load of the actuating spring varies its inclination also decreasing the lateral load as the axial load increases.

* * * * *